United States Patent
Lin et al.

(10) Patent No.: US 12,067,327 B2
(45) Date of Patent: Aug. 20, 2024

(54) DISPLAY APPARATUS AND METHOD FOR ADJUSTING HEADPHONE VOLUME

(71) Applicant: GIGA-BYTE TECHNOLOGY CO., LTD., New Taipei (TW)

(72) Inventors: Cheng-Lung Lin, New Taipei (TW); Tzu-Yi Tsao, New Taipei (TW); Chih-Cheng Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 90 days.

(21) Appl. No.: 17/824,231

(22) Filed: May 25, 2022

(65) Prior Publication Data

US 2023/0214169 A1 Jul. 6, 2023

(30) Foreign Application Priority Data

Dec. 30, 2021 (TW) ................................. 110149511

(51) Int. Cl.
*G06F 3/16* (2006.01)
*H04R 3/00* (2006.01)

(52) U.S. Cl.
CPC .............. *G06F 3/162* (2013.01); *G06F 3/165* (2013.01); *H04R 3/00* (2013.01); *H04R 2420/03* (2013.01); *H04R 2420/05* (2013.01)

(58) Field of Classification Search
None
See application file for complete search history.

(56) References Cited

U.S. PATENT DOCUMENTS 6,148,085 A * 11/2000 Jung .................. H04R 5/04 381/74
8,014,539 B2 * 9/2011 Song .................. H03F 3/181 381/74

(Continued)

FOREIGN PATENT DOCUMENTS

CN 101864932 A 2/2011
CN 108160887 A 11/2016

(Continued)

OTHER PUBLICATIONS

Taiwanese Office Action and Search Report for Taiwanese Application No. 110149511, dated Oct. 25, 2022.

(Continued)

*Primary Examiner* — Paul W Huber
(74) *Attorney, Agent, or Firm* — Birch, Stewart, Kolasch & Birch, LLP

(57) ABSTRACT

A display apparatus, which is electrically connected to a host, is provided. The display apparatus includes a display panel, a display controller, an audio interface, and an audio-processing chip. The display controller is configured to control displaying of the display panel. The audio interface includes a detection circuit configured to detect whether a pair of headphones is plugged into the audio interface. The audio-processing chip is configured to receive an audio signal from the host, and to convert the audio signal into an output audio signal. When the detection circuit detects that the pair of headphones has been plugged into the audio interface, the audio-processing chip adjusts strength of the output audio signal according to a headphone-volume setting of the display apparatus, and transmits the adjusted output audio signal to the pair of headphones for playback through the audio interface.

10 Claims, 3 Drawing Sheets

(56) References Cited

U.S. PATENT DOCUMENTS

| | | | | |
|---|---|---|---|---|
| 8,320,586 | B2 * | 11/2012 | Shen | H04R 29/001 |
| | | | | 381/74 |
| 9,124,980 | B2 * | 9/2015 | Doy | H04R 29/00 |
| 10,339,024 | B2 * | 7/2019 | White | G06F 11/3051 |
| 10,466,857 | B2 * | 11/2019 | Min | G06F 3/04817 |
| 2010/0124338 | A1 * | 5/2010 | Lee | H04R 5/02 |
| | | | | 381/74 |
| 2014/0376736 | A1 * | 12/2014 | Liu | H04R 1/1041 |
| | | | | 381/74 |

FOREIGN PATENT DOCUMENTS

| | | | |
|---|---|---|---|
| CN | 108303830 | A | 1/2017 |
| CN | 111190568 | A | 5/2020 |
| JP | 2009-538571 | A | 11/2009 |
| WO | WO 2007/140024 | A2 | 12/2007 |

OTHER PUBLICATIONS

Japanese Office Action for Japanese Application No. 2022-171532, dated Jan. 9, 2024, with English translation.

* cited by examiner

DISPLAY APPARATUS AND METHOD FOR ADJUSTING HEADPHONE VOLUME

CROSS REFERENCE TO RELATED APPLICATIONS

This Application claims priority of Taiwan Patent Application No. 110149511, filed on Dec. 30, 2021, the entirety of which is incorporated by reference herein.

BACKGROUND OF THE INVENTION

Field of the Invention

The invention relates to display apparatuses, and, in particular, to an electronic device and a method for adjusting headphone volume.

Description of the Related Art

Due to advancements in technology and the increase requirements for experience, gaming modes have changed from a single-interface control and screen display to an immersive experience (e.g., racing games with curved screens, virtual-reality head-mounted displays, etc.), interactive experiences (e.g., Switch fitness ring, augmented reality, etc.), or first-person shooter (FPS) games.

When the visual experience is improved, the user begins to expect an improvement in the auditory experience as well. Therefore, the user may be gradually immersed in the surrounding atmosphere in the game and the control of the sound. In addition, the user often unconsciously increases the decibel level of the sound in this situation. When the user wears a headphone or similar equipment and is in a high-decibel environment for a long time, the user's hearing is more likely to be affected, or even damaged.

Accordingly, there is demand for a display apparatus and a method for adjusting headphone volume to solve the aforementioned problem.

BRIEF SUMMARY OF THE INVENTION

In an exemplary embodiment, a display apparatus electrically connected to a host is provided. The display apparatus includes a display panel, a display controller, an audio interface, and an audio-processing chip. The display controller is configured to control displaying of the display panel. The audio interface includes a detection circuit configured to detect whether a headphone is plugged into the audio interface. The audio-processing chip is configured to receive an audio signal from the host, and to convert the audio signal into an output audio signal. When the detection circuit detects that the headphone has been plugged into the audio interface, the audio-processing chip adjusts strength of the output audio signal according to a headphone-volume setting of the display apparatus, and transmits the adjusted output audio signal to the headphone for playback through the audio interface.

In some embodiments, when the detection circuit detects that the headphone has been plugged into the audio interface, the detection circuit further detects an impedance of the headphone.

In some embodiments, when the impedance of the headphone belongs to a first type, the audio-processing chip uses a first driving voltage to drive the headphone. When the impedance of the headphone belongs to a second type, the audio-processing chip uses a second driving voltage to drive the headphone. The impedance of the second type is greater than the impedance of the first type, and the second driving voltage is higher than the first driving voltage.

In some embodiments, the display controller further displays an on-screen display (OSD) interface for adjusting the headphone-volume setting for the pair of headphones, and the headphone-volume setting corresponds to a sound level of a scalar bar. The scalar bar comprises a plurality of sound levels, and the sound levels comprise a first level and a second level that correspond to a first sound strength and a second sound strength, respectively, wherein the first sound strength is greater than the second sound strength, and the first level is higher than the second level.

In some embodiments, when the sound level is higher than or equal to the first level, the audio-processing chip activates a first headphone-volume adjustment mechanism. When the sound level is between the first level and the second level, the audio-processing chip activates a second headphone-volume adjustment mechanism. When the sound level is lower than the second level, the audio-processing chip maintains the output audio signal.

In some embodiments, the audio-processing chip executes the first headphone-volume adjustment mechanism and the second headphone-volume adjustment mechanism within a predetermined period of time. The first headphone-volume adjustment mechanism and the second headphone-volume adjustment mechanism comprise a plurality of first steps and a plurality of second steps, respectively. The first headphone-volume adjustment mechanism reduces the strength of the output audio signal with a first slope to advance to a next first step after staying at each first step for a first time until the strength of the output audio signal reaches a third sound strength, and the third sound strength is between the first sound strength and the second sound strength. The second headphone-volume adjustment mechanism reduces the strength of the output audio signal with a second slope to advance to a next second step after staying at each second step for a second time until the strength of the output audio signal reaches the second sound strength, wherein the first slope is greater than the second slope.

In another exemplary embodiment, a method for adjusting headphone volume, for use in a display apparatus, is provided. The display apparatus comprises a display panel, a display controller, an audio interface, and an audio-processing chip, and the display apparatus is electrically connected to a host. The method includes the following steps: utilizing the audio-processing chip to receive an audio signal from the host, and to convert the audio signal into an output audio signal; utilizing a detection circuit of the audio interface to detect whether a headphone is plugged into the audio interface; and when the detection circuit detects that the headphone has been plugged into the audio interface, utilizing the audio-processing chip to adjust strength of the output audio signal according to a headphone-volume setting of the display apparatus, and to transmit the adjusted output audio signal to the headphone for playback through the audio interface.

In some embodiments, the method further includes the following step: when the detection circuit detects that the headphone has been plugged into the audio interface, utilizing the detection circuit to detect impedance of the headphone. The method further includes the following steps: when the impedance of the headphone belongs to a first type, utilizing the audio-processing chip to use a first driving voltage to drive the pair of headphones, when the impedance of the headphone belongs to a second type; and utilizing the audio-processing chip to use a second driving voltage to drive the pair of headphones, wherein the impedance of the second type is greater than the impedance of the first type, and the second driving voltage is higher than the first driving voltage.

In some embodiments, the display controller further displays an on-screen display (OSD) interface for adjusting the headphone-volume setting for the pair of headphones, and the headphone-volume setting corresponds to a sound level of a scalar bar, wherein the scalar bar comprises a plurality of sound levels, and the sound levels comprise a first level and a second level that correspond to a first sound strength and a second sound strength, respectively, wherein the first sound strength is greater than the second sound strength, and the first level is higher than the second level.

In some embodiments, the method further includes the following steps: when the sound level is higher than or equal to the first level, utilizing the audio-processing chip to activate a first headphone-volume adjustment mechanism; when the sound level is between the first level and the second level, utilizing the audio-processing chip to activate a second headphone-volume adjustment mechanism; and when the sound level is lower than the second level, utilizing the audio-processing chip to maintain the output audio signal.

In some embodiments, the method further includes the following step: utilizing the audio-processing chips to perform the first headphone-volume adjustment mechanism and the second headphone-volume adjustment mechanism within a predetermined period of time. The first headphone-volume adjustment mechanism reduces the strength of the output audio signal with a first slope to advance to a next first step after staying at each first step for a first time until the strength of the output audio signal reaches a third sound strength, and the third sound strength is between the first sound strength and the second sound strength. The second headphone-volume adjustment mechanism reduces the strength of the output audio signal with a second slope to advance to a next second step after staying at each second step for a second time until the strength of the output audio signal reaches the second sound strength, wherein the first slope is greater than the second slope.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It should be understood that the words "comprising", "including" and the like used in this specification are used to indicate the existence of specific technical features, values, method steps, operation processes, elements and/or components, but not to exclude further technical features, values, method steps, work processes, elements, components, or any combination of the above may be added.

The use of terms such as "first", "second", and "third" in claims is used to modify elements in the claims, and is not used to indicate that there is a priority order, antecedent relationship, or Is an element preceded by another element, or a chronological order when performing a method step, only used to distinguish elements with the same name.

Figure 1:
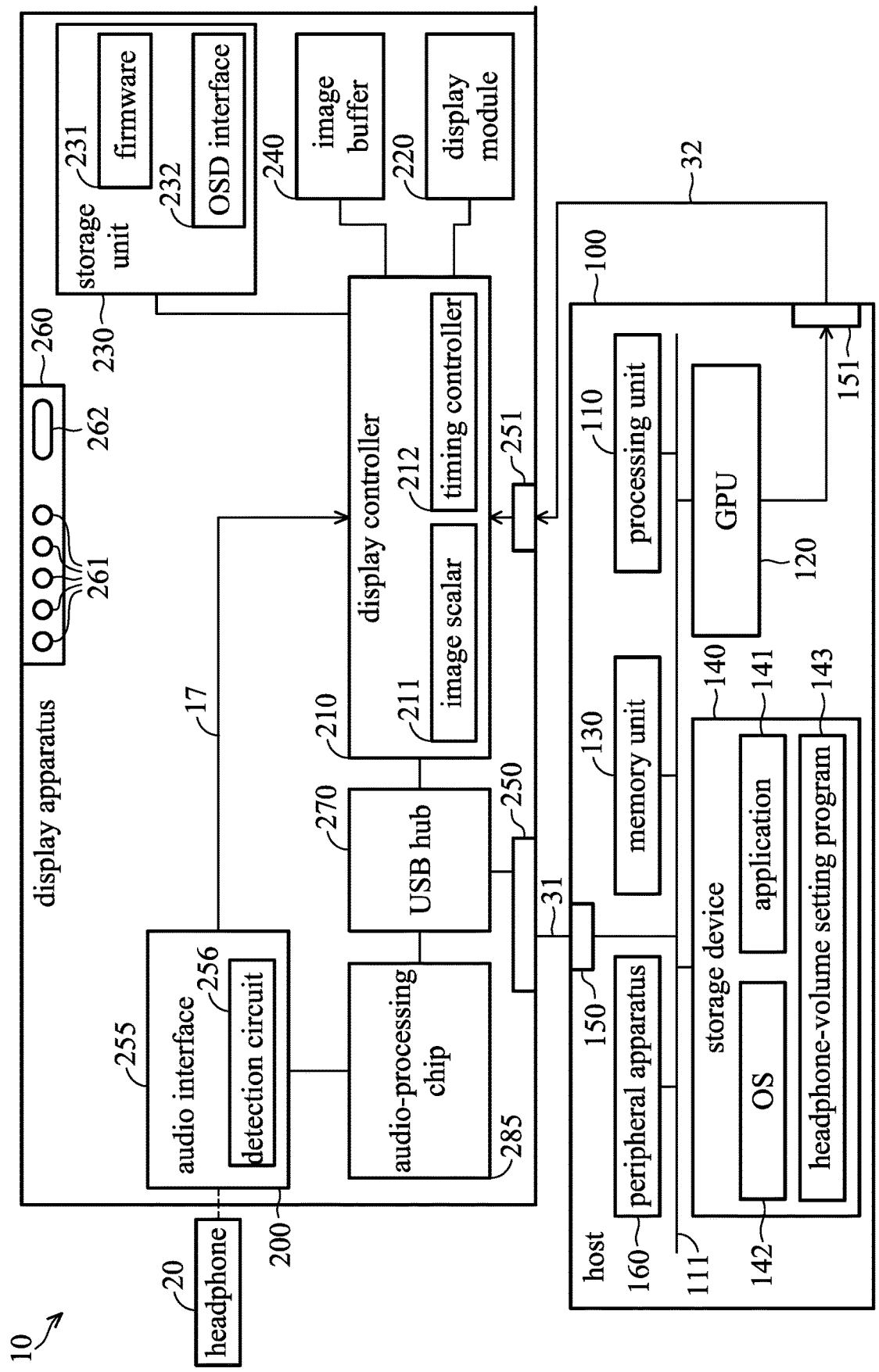
FIG. 1 is a block diagram of a display system in accordance with an embodiment of the invention.

FIG. 1 is a block diagram of a display system in accordance with an embodiment of the invention.

As illustrated in FIG. 1, the display system 10 includes a host 100 and a display apparatus 200. For example, the host 100 may be a personal computer or a server. The host 100 may include a processing unit 110, a graphics processing unit (GPU) 120, a memory unit 130, a storage device 140, transmission interfaces 150 and 151, and one or more peripheral apparatuses 160. The processing unit 110, graphics processing unit 120, memory unit 130, storage device 140, and transmission interface 150 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

For example, the storage device 140 may store an application 141, an operating system 142 (e.g., Windows, Linux, MacOS, etc.), and a headphone-volume setting program 143. The processing unit 110 may load the application 141, the operating system 142, and the headphone-volume setting program 143 to the memory unit 130 for execution. The application 141 can be, for example, any application program with audio playback, such as a game program, a media-player program, a utility program, and the like. The user may execute the headphone-volume setting program 143 on the host 100 to display a user interface for adjusting the headphone-volume setting of the pair of headphones 20 (i.e., abbreviated as headphones 20) connected to the display apparatus 200, such as adjusting the sound level of the headphones 20. The host 100 may transmit the adjusted sound-level setting to the display apparatus 200 through the channel 31, so the audio-processing chip 285 can adjust the strength of the output audio signal according to the sound-level setting. The peripheral apparatus 160, for example, may include input apparatuses such as a keyboard, a mouse, a touch pad, etc., but the invention is not limited thereto.

The graphics processing unit 120 may, for example, perform graphics processing on the application being executed by the processing unit 110 to generate an image signal that includes one or more images, and transmit the image signal to the transmission interface 251 of the display apparatus 200 through the transmission interface 151, where the channel 32 between the transmission interfaces 151 and 251 can be regarded as an image-transmission channel. The transmission interfaces 151 and 251 may include wired transmission interfaces and/or wireless transmission interfaces. The wired transmission interfaces may include: high definition multimedia interface (HDMI), DisplayPort (DP) interface, embedded DisplayPort (eDP) interface, low-voltage differential signaling (LVDS) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, Wi-Fi, near-field communication (NFC) interface, etc., but the invention is not limited thereto.

In addition, the processing unit 110 may transmit data to the transmission interface 250 of the display apparatus 200 through the transmission interface 150, wherein the transmission interfaces 150 and 250 may be, for example, USB interfaces or USB Type-C interfaces which support USB 3.1 and/or USB 2.0 protocols. The channel 31 between the transmission interfaces 150 and 250 can be regarded as a data-transmission channel.

The display apparatus 200 is electrically connected to the host 100. The display apparatus 200 includes a display controller 210, a display module 220, a storage unit 230, an image buffer 240, transmission interfaces 250 and 251, an audio interface 255, an input interface 260, a USB hub 270, and an audio-processing chip 285.

The display controller 210, for example, may be implemented by an application-specific integrated circuit (ASIC), a system-on-chip (SoC), a processor, or a microcontroller, but the invention is not limited thereto.

The display module 220, for example, may be a liquid-crystal display panel, a light-emitting diode (LED) display panel, an organic light-emitting diode (OLED) display panel, a cathode ray tube (CRT) display, an E-Ink display module, an electroluminescent display module, a plasma display module, a projection display module, or a quantum dot display module, but the invention is not limited thereto.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 232. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 231 can be further used to control the OSD interfaces 232 of the display apparatus 200.

In an embodiment, the display controller 210 may read the firmware 231 and program code of the OSD interface 232 stored in the storage unit 230 via a bus (e.g., an I2C bus), and configure the corresponding display parameters. In addition, the display controller 210 may transmit the EDID of the display apparatus 200 to the host 100 via the transmission interface 250 or 251 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 232, for example, may include an OSD menu and corresponding options, an information dashboard, a timer, a counter, a crosshair, a specific symbol, a specific color, a specific text, or a combination thereof, but the invention is not limited thereto. In some embodiments, the OSD interfaces 232 may include a function menu of headphone-volume setting for adjusting the strength of the output audio signal (e.g., sound level).

The image buffer 240, for example, may be a volatile memory (e.g., a DRAM) or a non-volatile memory (e.g., a flash memory), that is configured to store output images to be displayed on the display module 220, wherein the host 100 or the display controller 210 may, according to an OSD enable signal generated by the host 100, overwrite a specific region of the image signal stored in the image buffer 240 with the one or more OSD interfaces 232.

The input interface 260 is configured to control the OSD menu of the display apparatus 200. The input interface 260 may be implemented by one or more physical buttons 261 or a five-way joystick 262 to implement instructions such as up, down, left, right, and confirm. The host 100 may transmit data to the display controller 210 through the transmission interfaces 150 and 250 and the USB hub 270, and the display controller 210 may also transmit data to the host 100 through the transmission interfaces 150 and 250 and the USB hub 270.

The audio interface 255 may be, for example, a 3.5 mm jack, and can include a detection circuit 256 to detect whether the headphones 20 is plugged into the audio interface 255. When the detection circuit 256 does not detect that the headphones 20 is plugged into the audio interface 255, the plug-in determination signal 17 output by the detection circuit 256 is, for example, in a high-logic state. When the detection circuit 256 detects that the headphones 20 is plugged into the audio interface 255, the plug-in determination signal output by the detection circuit 256 is, for example, in a low-logic state.

In addition, when the headphone has been connected to the audio interface 255, the detection circuit 256 is further used to detect the impedance of the headphones 20, For example, the impedance of the headphones 20 can be roughly divided into two types. The first type is a normal impedance (e.g., about 3 to 64 ohms), and the second type is a high impedance (e.g., about 600 ohms or above). When the detection circuit 256 detects that the headphones 20 are normal-impedance headphones, the audio-processing chip 285 uses a driving voltage of 1 Vrms to drive the headphones 20. When the detection circuit 256 detects that the headphones 20 are high-impedance headphones, the audio-processing chip 285 uses a driving voltage of 2 Vrms to drive the headphones 20, but the invention is not limited to the aforementioned driving voltages.

The audio-processing chip 285 is used to receive the audio signal from the host 100, and to convert the audio signal (e.g., a digital audio signal) into an output audio signal (e.g., an analog audio signal) used by the headphones 20. The audio-processing chip 285, for example, may include a digital-to-analog converter and an audio amplifier (both not shown in FIG. 1) to perform the aforementioned operations. In some embodiments, if the transmission interfaces 151 and 251 are HDMI interfaces or DisplayPort interfaces, the audio/video signal generated by the host 100 are transmitted to the display controller 210 through the channel 32. At this time, the display controller 210 will process the image signal in the audio/video signal, and transmit the audio signal in the audio/video signal to the audio-processing chip 285 through the USB hub 270.

In some other embodiments, the audio signal generated by the host 100 is transmitted to the display apparatus 200 through the channel 31. At this time, the audio-processing chip 285 can receive the audio signal from the host 100 through the USB hub 270.

Figures 2A, 2B:
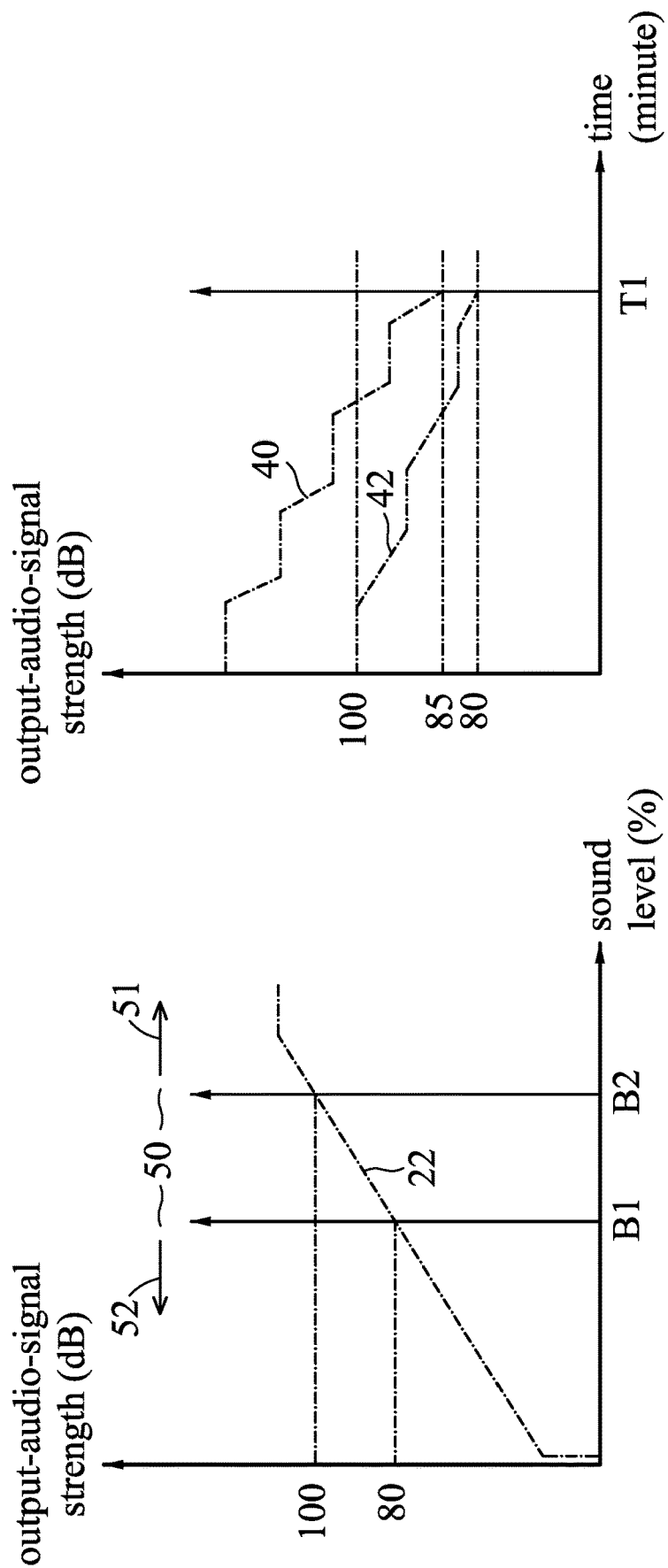
FIG. 2A is a diagram of the relationship curve between the sound level and strength of the output audio signal in accordance with an embodiment of the invention.
FIG. 2B is a diagram of the relationship curve between time and the strength of the output audio signal in accordance with an embodiment of the invention.

FIG. 2A is a diagram of the relationship curve between the sound level and strength of the output audio signal in accordance with an embodiment of the invention. FIG. 2B is a diagram of the relationship curve between time and the strength of the output audio signal in accordance with an embodiment of the invention. Please refer to FIG. 1 and FIGS. 2A-2B.

In an embodiment, when the detection circuit 256 has detected that the headphones 20 is connected to the audio interface 255, the detection circuit 256 may transmit the plug-in determination signal 17 (e.g., in a low-logic state) to the display controller 210. At this time, the display controller 210 may read the sound-level setting of the headphone volume from the firmware 231, and the audio-processing chip 285 may determine whether to use a first headphone-volume adjustment mechanism, a second headphone-volume adjustment mechanism, or maintains the output audio signal (i.e., no adjustment) according to the sound-level setting.

For example, the user may adjust the desired headphone-volume setting (e.g., the sound level of the output audio signal) through the headphone-volume adjustment menu in the OSD interface 232 of the display apparatus 200, such as adjusting the sound level of the scalar bar. If the sound levels are divided into 10 levels, the aforementioned sound-level value can be between 0 and 10. If the sound levels are divided into 100 levels, the aforementioned sound-level value can be between 0 and 100. For convenience of description, the sound levels are divided into 10 levels in the following embodiments.

As shown in FIG. 2A, the sound level B2 corresponds to the output-audio-signal strength being 100 dB, and the sound level B1 corresponds to the output-audio-signal strength being 80 dB. The relationship between the sound level and the output-audio-signal strength is shown in curve 22. In some embodiments, the sound levels B1 and B2 are respectively 7 and 9, but the invention is not limited thereto, and one having ordinary skill in the art can adjust the sound levels B1 and B2 according to actual needs.

The audio-processing chip 285 may obtain the sound level SL of the display apparatus 200 from the display controller 210, and determine whether to activate the first headphone-volume adjustment mechanism, the second headphone-volume adjustment mechanism or maintain the output audio signal (i.e., no adjustment). When the audio-processing chip 285 determines that the sound level SL of the display apparatus 200 is higher than or equal to a value B2 (SL≥B2) (i.e., region 51), it indicates that the output-audio-signal strength will be higher than or equal to 100 dB. If the user uses the headphones 20 to listen, it will be in a high-decibel environment for a long time, thereby affecting or damaging the user's hearing. At this time, the audio-processing chip 285 will determine that the first headphone-volume adjustment mechanism is used to gradually reduce the strength of the output audio signal over time, and finally the output-audio-signal strength can reach a sound level (e.g., 85 dB) slightly higher than the safe volume level (e.g., 80 dB).

When the audio-processing chip 285 determines that the sound level SL is between the values B1 and B2 (B1≤SL<B2) (i.e., region 50), it indicates that the output-audio-signal strength is between 80 dB and 100 dB. If the user uses the headphones 20 to listen, it will be a normal high-decibel environment, and listening to the audio signal in this sound-strength range for a long time will still affect or damage the user's hearing. At this time, the audio-processing chip 285 determines that the second headphone-volume adjustment mechanism is used to gradually reduce the strength of the output audio signal over time, and finally the output-audio-signal strength can reach a safe volume level (e.g., 80 dB).

When the audio-processing chip 285 determines that the sound level SL of the display apparatus 200 is lower than the value B1 (SL>B1) (i.e., region 52), it indicates that the output-audio-signal strength is lower than 80 dB. If the user uses the headphone 20 to listen, because the output-audio-signal strength is within a safe range, the user's hearing will not be affected or damaged. At this time, the audio-processing chip 285 will determine to maintain the output-audio-signal strength, that is, not to adjust the strength of the output audio signal.

Please refer to FIG. 2B. Curve 40 shows the relationship of the output-audio-signal strength over time using the first headphone-volume adjustment mechanism, and curve 42 shows the relationship of the output-audio-signal strength overtime using the second headphone-volume adjustment mechanism. The execution time of the curves 40 and 42 stops when time T1 is reached. The goals of the first headphone-volume adjustment mechanism and the second headphone-volume adjustment mechanism are to decrease the output-audio-signal strength over time to a first target strength (e.g., 85 dB) and a second target strength (e.g., 80 dB), respectively. In some embodiments, time T1 may be 15 minutes, but the invention is not limited thereto, and one having ordinary skill in the art can adjust the value of time T1 according to actual needs.

In addition, as shown in FIG. 2B, the number of steps in curve 40 is greater than that in curve 42, and the slope of curve 40 to reduce the output-audio-signal strength is also greater than that of curve 42 to reduce the output-audio-signal strength. For example, the flat region in curves 40 and 42 can be considered to be the first step. In FIG. 2B, curve 40 has four steps, and curve 42 has three steps. In addition, the slope between two neighboring steps in curve 40 is greater than that between two neighboring steps in curve 42. The dwell time at each step of curve 40 (i.e., the duration of each flat region) can be longer than, equal to, or shorter than the dwell time at each step of curve 42, depending on actual needs.

Specifically, in the embodiment of FIG. 2B, if the audio-processing chip 285 activates the first headphone-volume adjustment mechanism, the audio-processing chip 285 can gradually adjust the output-audio-signal strength greater than 100 dB through four levels over time, and finally reaches the first target strength (e.g., 85 dB) at time T1, where the first target strength is slightly higher than the safer target strength (e.g., 80 dB). For example, when the user is very immersed in the game experience or the virtual-reality experience, the volume setting of the headphones 20 in the display apparatus 200 may be adjusted to a higher sound level, which corresponds to a higher sound strength that will affect the user's hearing. In this case, the audio-processing chip 285 activates the first headphone-adjustment mechanism to gradually reduce the output-audio-signal strength over time, but the final output-audio-signal strength (i.e., the first target strength) is slightly higher than the safe target strength, so as to avoid directly limiting the output-audiosignal strength to the safe target strength and greatly affecting the user's experience of playing games or virtual reality.

If the audio-processing chip 285 activates the second headphone-volume adjustment mechanism, the audio-processing chip 285 can gradually reduce the output-audio-signal strength between 80 dB and 100 dB through three levels over time, and finally reach the second target strength (e.g., 80 dB) at time T1, wherein the second target strength is equal to the safe target strength (e.g., 80 dB). For example, when the user adjusts the volume setting of the headphones 20 in the display apparatus 200 to a moderate sound level, which corresponds to a moderate sound strength, in a game experience or in a virtual-reality experience, the adjusted sound strength is still slightly higher than the safe sound strength and it will slightly affect the user's hearing. In this case, the audio-processing chip 285 activates the second headphone-volume adjustment mechanism to gradually reduce the output-audio-signal strength over time, but the final output-audio-signal strength (i.e., the second target strength) will be equal to the safe target strength, and it will not significantly affect the user's experience of playing games or virtual reality.

Figure 3:
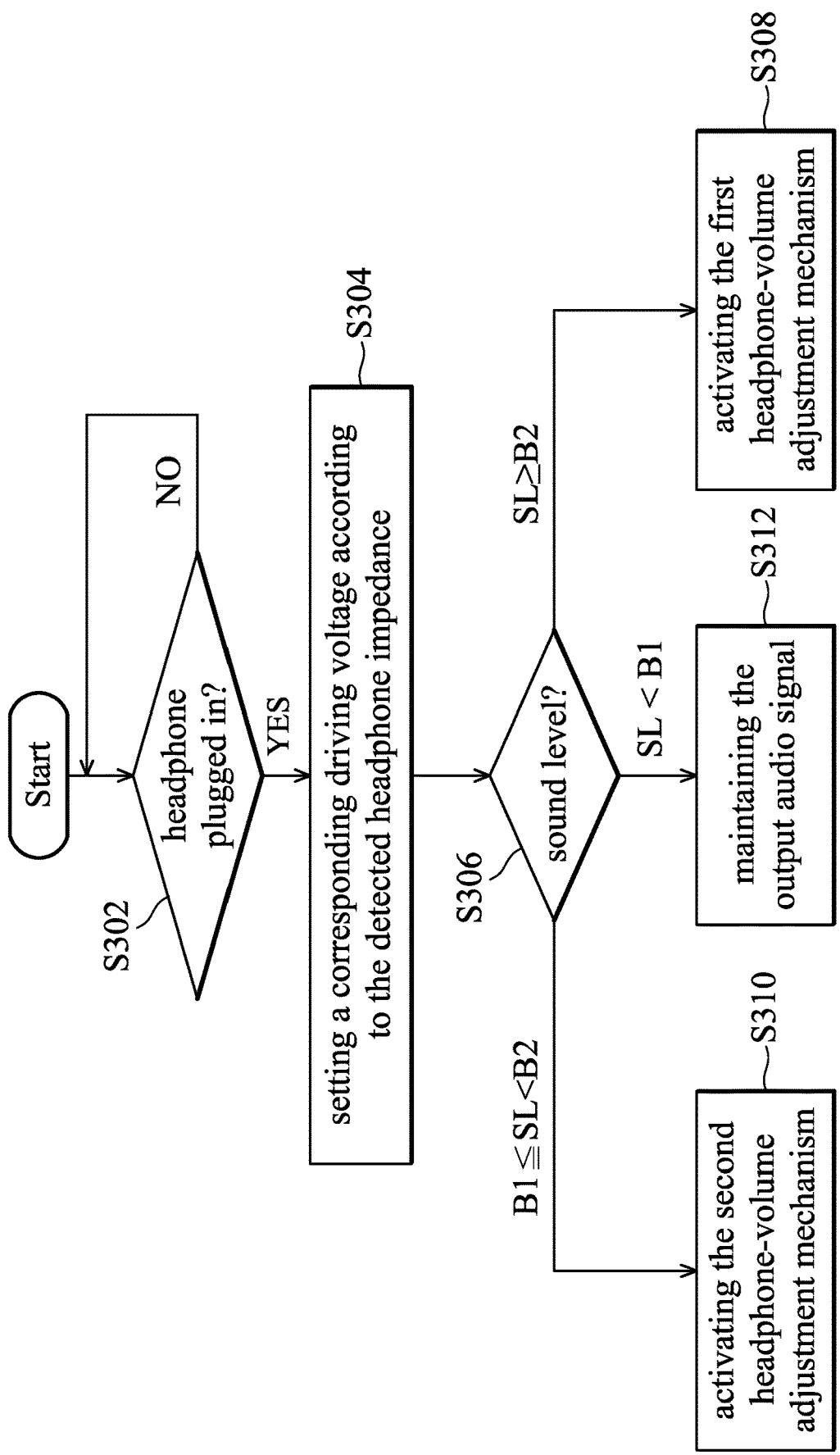
FIG. 3 is a flow chart of a method for adjusting headphone volume in accordance with an embodiment of the invention.

FIG. 3 is a flow chart of a method for adjusting headphone volume in accordance with an embodiment of the invention. Please refer to FIG. 1 to FIG. 3.

In step S302, the detection circuit 256 determines whether the pair of headphones 20 is plugged in. For example, the detection circuit 256 can be used to detect whether a headphone is plugged into the audio interface 255. When the detection circuit 256 does not detect any headphone being plugged into the audio interface 255, the plug-in determination signal 17 output by the detection circuit 256 may be, for example, in the high-logic state. When the detection circuit 256 detects that a headphone is plugged into the audio interface 255, the plug-in determination signal 17 output by the detection circuit 256 is in the low-logic state.

In step S304, a corresponding driving voltage is set according to the detected impedance of the headphone. For example, when the headphone has been connected to the audio interface 255, the detection circuit 256 is further used to detect the impedance of the headphones 20, For example, the impedance of the headphones 20 can be roughly divided into two types. The first type is a normal impedance (e.g., about 3 to 64 ohms), and the second type is a high impedance (e.g., about 600 ohms or above). When the detection circuit 256 detects that the headphones 20 are normal-impedance headphones, the audio-processing chip 285 uses a driving voltage of 1 Vrms to drive the headphones 20. When the detection circuit 256 detects that the headphones 20 are high-impedance headphones, the audio-processing chip 285 uses a driving voltage of 2 Vrms to drive the headphones 20, but the invention is not limited to the aforementioned driving voltages.

In step S306, the sound level SL is determined. When the sound level SL is higher than the first level (e.g., sound level B2), step S308 is performed. When the sound level SL is between the first level and the second level, step S310 is performed. When the sound level SL is lower than the second level (e.g., sound level B1), step S312 is performed. For example, the strength of the output audio signal generated by the audio-processing chip 285 can be set according to the sound-level setting in the firmware 231 or the sound-level setting from the headphone-volume setting program 143 of the host 100.

In step S308, the audio-processing chip 285 activates the first headphone-volume adjustment mechanism. For example, when the audio-processing chip 285 determines that the sound level SL of the display apparatus 200 is higher than or equal to a value B2 (SL≥B2) (i.e., region 51), it indicates that the output-audio-signal strength will be higher than or equal to 100 dB. If the user uses the headphones 20 to listen, it will be in a high-decibel environment for a long time, thereby affecting or damaging the user's hearing. At this time, the audio-processing chip 285 will determine that the first headphone-volume adjustment mechanism is used to gradually reduce the strength of the output audio signal over time, and finally the output-audio-signal strength can reach a sound level (e.g., 85 dB) slightly higher than the safe volume level (e.g., 80 dB).

In step S310, the audio-processing chip 285 activates the second headphone-volume adjustment mechanism. For example, when the audio-processing chip 285 determines that the sound level SL is between the values B1 and B2 (B1≤SL<B2) (i.e., region 50), it indicates that the output-audio-signal strength is between 80 dB and 100 dB. If the user uses the headphones 20 to listen, it will be a normal high-decibel environment, and listening to the audio signal in this sound-strength range for a long time will still affect or damage the user's hearing. At this time, the audio-processing chip 285 determines that the second headphone-volume adjustment mechanism is used to gradually reduce the strength of the output audio signal over time, and finally the output-audio-signal strength can reach a safe volume level (e.g., 80 dB).

In step S312, the audio-processing chip 285 maintains the output audio signal. For example, when the audio-processing chip 285 determines that the sound level SL of the display apparatus 200 is lower than the value B1 (SL>B1) (i.e., region 52), it indicates that the output-audio-signal strength is lower than 80 dB. If the user uses the headphone 20 to listen, because the output-audio-signal strength is within a safe range, the user's hearing will not be affected or damaged. At this time, the audio-processing chip 285 will determine to maintain the output-audio-signal strength, that is, not to adjust the strength of the output audio signal.

In view of the above, a display apparatus and a method for adjusting the headphone volume, which are capable of activating different headphone-volume adjustment mechanisms according to the sound-level setting of the output audio signal, and then gradually reducing the output-audio-signal strength, which is higher than the safe sound strength level, to a target strength, so as to prevent the user from being in a high-decibel environment for a long time when wearing a headphone or similar equipment, which will affect or damage the user's hearing. The display apparatus and the method are also capable of avoiding significantly affecting the user's experience of playing games or virtual reality, and protecting the user's hearing.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A display apparatus, electrically connected to a host, the display apparatus comprising:
   a display panel;
   a display controller, configured to control displaying of the display panel;

an audio interface, comprising a detection circuit configured to detect whether a pair of headphones is plugged into the audio interface; and an audio-processing chip, configured to receive an audio signal from the host, and to convert the audio signal into an output audio signal, wherein when the detection circuit detects that the pair of headphones has been plugged into the audio interface, the audio-processing chip adjusts strength of the output audio signal according to a headphone-volume setting of the display apparatus, and transmits the adjusted output audio signal to the headphone for playback through the audio interface, wherein the audio-processing chip executes a first headphone-volume adjustment mechanism and a second headphone-volume adjustment mechanism within a predetermined period of time, wherein the first headphone-volume adjustment mechanism and the second headphone-volume adjustment mechanism respectively comprise a plurality of first steps and a plurality of second steps, wherein the first headphone-volume adjustment mechanism reduces the strength of the output audio signal with a first slope to advance to a next first step after staying at each first step for a first time until the strength of the output audio signal reaches a third sound strength, the third sound strength is between a first sound strength and a second sound strength, and the first sound strength is greater than the second sound strength, wherein the second headphone-volume adjustment mechanism reduces the strength of the output audio signal with a second slope to advance to a next second step after staying at each second step for a second time until the strength of the output audio signal reaches the second sound strength, wherein the first slope is greater than the second slope.

2. The display apparatus as claimed in claim 1, wherein when the detection circuit detects that the pair of headphones has been plugged into the audio interface, the detection circuit further detects an impedance of the headphone.

3. The display apparatus as claimed in claim 2, wherein when the impedance of the headphone belongs to a first type, the audio-processing chip uses a first driving voltage to drive the pair of headphones, wherein when the impedance of the headphone belongs to a second type, the audio-processing chip uses a second driving voltage to drive the pair of headphones, wherein the impedance of the second type is greater than the impedance of the first type, and the second driving voltage is higher than the first driving voltage.

4. The display apparatus as claimed in claim 3, wherein the display controller further displays an on-screen display (OSD) interface for adjusting the headphone-volume setting for the pair of headphones, and the headphone-volume setting corresponds to a sound level of a scalar bar, wherein the scalar bar comprises a plurality of sound levels, and the sound levels comprise a first level and a second level that respectively correspond to the first sound strength and the second sound strength, wherein the first level is higher than the second level.

5. The display apparatus as claimed in claim 4, wherein when the sound level is higher than or equal to the first level, the audio-processing chip activates the first headphone-volume adjustment mechanism, wherein when the sound level is between the first level and the second level, the audio-processing chip activates the second headphone-volume adjustment mechanism, wherein when the sound level is lower than the second level, the audio-processing chip maintains the output audio signal.

6. A method for adjusting headphone volume, for use in a display apparatus, wherein the display apparatus comprises a display panel, a display controller, an audio interface, and an audio-processing chip, and the display apparatus is electrically connected to a host, the method comprising:

utilizing the audio-processing chip to receive an audio signal from the host, and to convert the audio signal into an output audio signal;

utilizing a detection circuit of the audio interface to detect whether a headphone is plugged into the audio interface; and when the detection circuit detects that the headphone has been plugged into the audio interface, utilizing the audio-processing chip to adjust strength of the output audio signal according to a headphone-volume setting of the display apparatus, and to transmit the adjusted output audio signal to the headphone for playback through the audio interface, utilizing the audio-processing chips to execute a first headphone-volume adjustment mechanism and a second headphone-volume adjustment mechanism within a predetermined period of time, wherein the first headphone-volume adjustment mechanism and the second headphone-volume adjustment mechanism respectively comprise a plurality of first steps and a plurality of second steps, wherein the first headphone-volume adjustment mechanism reduces the strength of the output audio signal with a first slope to advance to a next first step after staying at each first step for a first time until the strength of the output audio signal reaches a third sound strength, the third sound strength is between a first sound strength and a second sound strength, and the first sound strength is greater than the second sound strength, wherein the second headphone-volume adjustment mechanism reduces the strength of the output audio signal with a second slope to advance to a next second step after staying at each second step for a second time until the strength of the output audio signal reaches the second sound strength, wherein the first slope is greater than the second slope.

7. The method as claimed in claim 6, further comprising:
when the detection circuit detects that the headphone has been plugged into the audio interface, utilizing the detection circuit to detect impedance of the headphone.

8. The method as claimed in claim 7, further comprising:
when the impedance of the headphone belongs to a first type, utilizing the audio-processing chip to use a first driving voltage to drive the headphone; and when the impedance of the headphone belongs to a second type, utilizing the audio-processing chip to use a second driving voltage to drive the headphone;

wherein the impedance of the second type is greater than the impedance of the first type, and the second driving voltage is higher than the first driving voltage.

9. The method as claimed in claim 8, wherein the display controller further displays an on-screen display (OSD) interface for adjusting the headphone-volume setting for the pair of headphones, and the headphone-volume setting corresponds to a sound level of a scalar bar,
> wherein the scalar bar comprises a plurality of sound levels, and the sound levels comprise a first level and a second level that correspond to the first sound strength and the second sound strength, respectively,
>
> wherein the first level is higher than the second level.

10. The method as claimed in claim 9, further comprising:
> when the sound level is higher than or equal to the first level, utilizing the audio-processing chip to activate the first headphone-volume adjustment mechanism;
>
> when the sound level is between the first level and the second level, utilizing the audio-processing chip to activate the second headphone-volume adjustment mechanism; and
>
> when the sound level is lower than the second level, utilizing the audio-processing chip to maintain the output audio signal.

\* \* \* \* \*